March 3, 1964
J. J. FALLS
3,123,420
APPARATUS FOR CONDUCTING CURRENT TO A
ROTATING ELECTROLYTIC TOOL
Filed Sept. 1, 1960
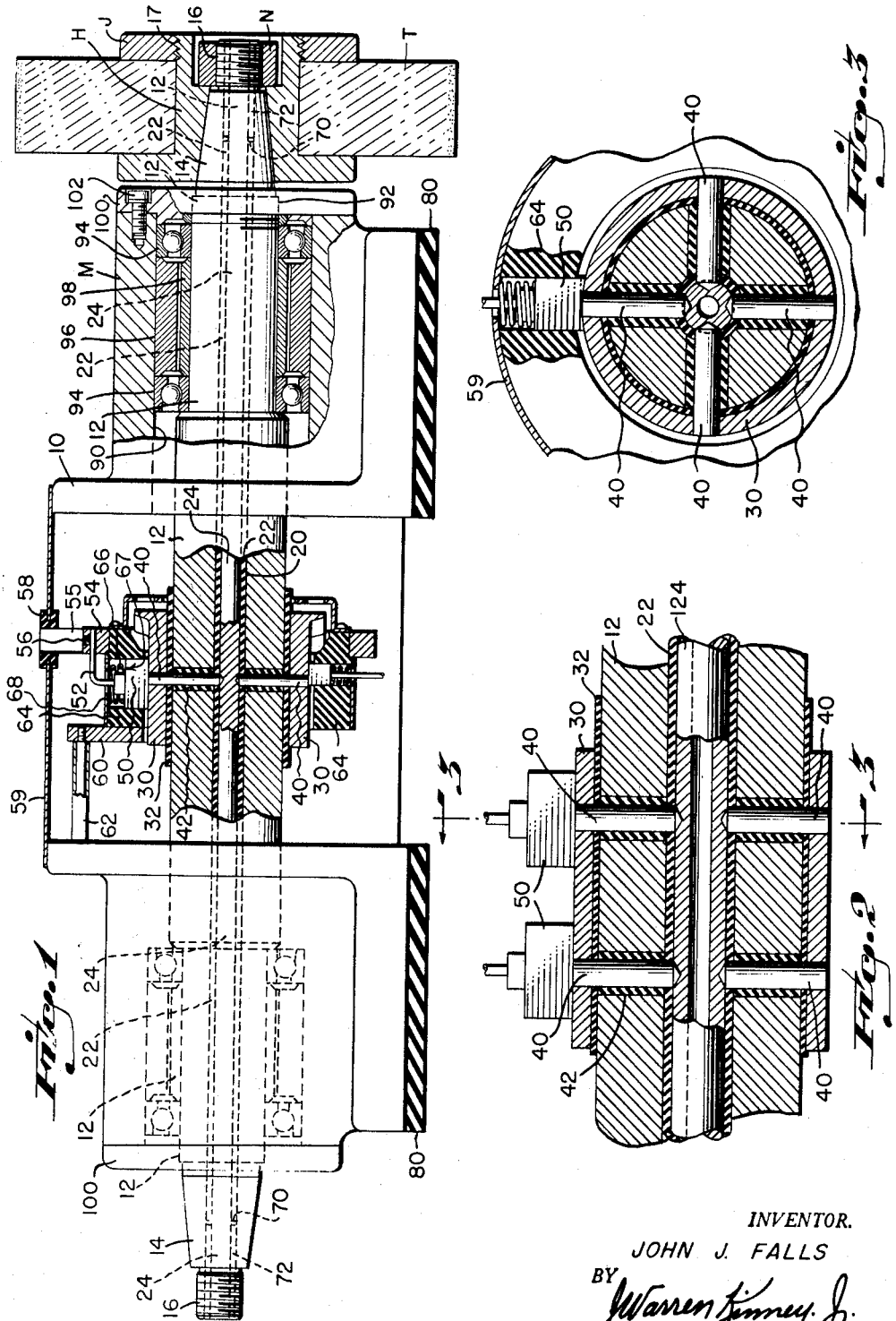
INVENTOR.
JOHN J. FALLS
BY
J. Warren Kinney Jr.
ATTORNEY

United States Patent Office 3,123,420
Patented Mar. 3, 1964

3,123,420
APPARATUS FOR CONDUCTING CURRENT TO A ROTATING ELECTROLYTIC TOOL
John J. Falls, Cincinnati, Ohio, assignor to Setco Industries, Inc., Cincinnati, Ohio, a corporation of Ohio
Filed Sept. 1, 1960, Ser. No. 53,391
2 Claims. (Cl. 339—5)

This invention relates to a method of and apparatus for effectively and efficiently applying a high amperage, low voltage potential to an electrolytic tool secured to and carried by a rotatable shaft.

It frequently becomes desirable or necesary to provide an electrolytic tool on or to the spindle of a conventional machine tool, in which event a high amperage, low voltage potential must be applied to said tool.

One of the primary objects of the present invention is to provide a simple yet highly effective method and means for efficiently applying a high amperage, low voltage potential to an electrolytic tool secured to and carried by the rotatable spindle of a machine tool.

Another object of the invention is to provide means for efficiently and effectively applying a high amperage, low voltage potential intermediate the length of a machine tool spindle to one or both ends of which an electrolytic tool may be mounted.

These and other objects are attained by the means described herein and as disclosed in the accompanying drawings, in which:

FIG. 1 is a side elevational view of the spindle mounting of a typical machine tool embodying the teachings of the present invention, wherein portions have been broken away for clarity of detail and understanding.

FIG. 2 is a view similar to the central portion of FIG. 1, disclosing an alternative construction which embodies a detail of the present invention.

FIG. 3 is a vertical section taken on line 3—3 of FIG. 2.

Reference may be made to my Patent No. 2,946,731 for a full and detailed description of a method and apparatus for electrolytic shaping, it being understood that the present invention is neither directed to nor concerned with the structural details of the electrolytic tool nor with the manner in which electrolyte is supplied to and between the electrolytic tool and workpiece. The present invention is directed solely to providing a high amperage, low voltage potential to an electrolytic tool secured to and carried by a rotatable spindle, wherein said potential is applied intermediate the length of the spindle.

At the outset it should be noted that a steel spindle is comparatively satisfactory for conducting low voltage potentials wherein the amperage to be carried is less than 300 amperes, however in those instances wherein the amperage approaches and exceeds 300 amperes, it is necessary to provide electrical conduction means such as copper, having a higher or more efficient conductivity factor than that of, say, steel.

The present invention will, therefore, be described as being applicable to solid steel spindles carrying amperages of less than 300 amperes and to hollow steel spindles having a high-efficiency conductor disposed axially therethrough for handling currents ranging from 300 to 3000 amperes.

With reference now to FIG. 1, the numeral 10 denotes generally the conventional housing within which a steel spindle 12 is rotatably journaled. The spindle may be caused to rotate by means such as, by way of example, an electric motor, not illustrated, within an end such as M, of the housing. The opposite ends of the spindle may be provided with tapered portions 14, the outer ends of which terminate in threaded portions 16, it being understood that the hub H of a suitable tool T may be selectively associated with the complementary tapered portions 14 and secured thereon by means of a nut N engaging threaded portions 16, and a nut J engaging threaded portions 17 of hub H.

It should be noted that, if desired, spindle 12 may be rotated by means of a suitable pulley arrangement in driving engagement with one end of the spindle, in which event an electric motor would not be provided as at M within the housing 10. In other words, the present invention is neither concerned with nor directed to the particular means utilized for imparting rotary motion to spindle 12, nor to the manner in which the spindle is rotatably journaled within the housing.

The housing 10 is provided with a cylindrical bore 90 which extends through each end thereof. The ends of the spindle 12 are each provided with a reduced end portion 92 which extends coaxially through the bore 90. A pair of conventional ball bearing assemblies 94 are mounted on each of the end portions 92 and fitted within the bore 90 so as to rotatably journal the spindle 12 coaxially in relation to the bore 90. The ball bearing assemblies 94 are maintained in spaced relationship by coaxial sleeves 96 and 98 which are preferably press-fitted within bore 90 and on reduced end portion 92 respectively. A stop ring 100 is connected to each end of housing 10 by means of threaded studs 102. Each of the stop rings 100 abuts one of the outer bearing assemblies 94 so as to maintain it in position. Each of the inner bearing assemblies 94 abut a radial shoulder formed on the spindle 12. The manner of rotatably journaling each end of the spindle 12 within housing 100 is preferably the same. The specific bearing means illustrated is merely exemplary, and other bearing means may be employed if so desired.

The numeral 20 denotes an axial bore extending throughout the length of spindle 12 for the reception of electrical insulating material 22 which encases copper conductor rod 24, which, as noted, is disposed lengthwise through and axially of spindle 12.

A collector ring 30 is fixed relative to shaft 12 and conductor rod 24 whereby it will rotate with spindle 12 without slipping thereon. An electrical contact is established between the collector ring 30 and the conductor rod 24 by means of one or more conductor pins 40.

The collector ring is electrically insulated from spindle 12 by means of insulation 32 and conductor pins 40 are electrically insulated from spindle 12 by means of insulators 42.

The numeral 50 denotes a brush having pigtail 52 secured to bus bar 54 such as by means of a set screw 56, it being noted that the brush is secured to and carried by a brush-holder-bracket 60 which is fixedly secured to a portion of housing 10 by means of a bracket arm 62, whereby the brush-holder-bracket will be fixedly secured relative to housing 10 and out of contacting relationship with the collector ring 30. The numeral 64 denotes generally brush-holders of insulating material. A spring 66 interposed between the outer face 67 of the brush and the inner, adjacent face of the spring-retainer-clip 68 normally and yieldably urges the lower face of the brush against and in contacting relationship with the outer face of the collector ring 30.

From the foregoing, it will be noted that an electrical potential applied to bus bar 54 will be conducted directly to conductor pins 40.

A leg 55 of bus bar 54 may project through an insulator 58 secured to and carried by cover plate 59, it being understood that a negative charge will be applied to said leg by any suitable means not pertinent to the present invention.

In the preferred embodiment of the invention, the insulating material 22 surrounding the conductor rod 24 terminates as at 70, short of the end of said rod, which preferably extends throughout the entire length of spindle 12. A sleeve 72 of highly conductive material such as, by way of example, the same material from which conductor rod 24 is fabricated is provided between the outer periphery of rod 22 and the periphery of bore 20 of the spindle, beyond the ends of insulating material 22 for thereby providing a good and substantial electrical contact between conductor rod 24 and an end of spindle 12.

Uniformly satisfactory results have been obtained in those instances wherein the conductor sleeves 72 make a tight fit with the adjacent surfaces of the conductor rod and bore spindle 12.

From the foregoing, it will be understood that a high amperage, low voltage potential will be effectively applied to the hub H of an electrolytic tool T secured to and carried by either or both ends 14 of the spindle.

The numeral 80 denotes insulation which is interposed between housing 10 and the frame, pedestal or base of a machine tool or other device with which and/or on which housing 10 is mounted.

In those instances where it is difficult, impossible, or inconvenient to insulate spindle 12 from the rest of the machine, such as by the use of insulating members 80 interposed between housing 10 and its support, other means such as illustrated in Patent 2,946,731 may be resorted to for insuring that the spindle 12 will be effectively insulated from the base, pedestal or frame of the machine, since the present invention is neither directed to nor concerned with the particular manner in which spindle 12 is electrically insulated from the base, pedestal or other support with which the spindle is associated.

With reference now to FIGS. 2 and 3, it will be noted that a plurality of conductor pins 40 have been utilized for the purpose of establishing an electrical connection between the conductor rod or tube 124 and the collector ring 30. Since each brush is capable of conducting 125 amperes, the number of brushes utilized will, in any instance, be determined by dividing the overall amperage to be applied to conductors 24 and/or 124 by 125. Quite obviously the diametric dimensions of the axial conductors will also be determined by the amount of current to be conducted.

In those instances wherein comparatively low amperage is to be used in an electrolytic shaping process, the collector ring 30 may be secured directly to and in conducting relationship with spindle 12, in which event conductor pins 42 and axial conductor rod 24 and/or conductor tube 124 may be omitted.

It should be understood that the foregoing arrangement may be utilized by merely cutting into the spindle housing for accommodating the electrical conduction means such as, by way of example, is illustrated in FIG. 1 hereof.

A suitable terminal block will be provided in conjunction with bus bar 54, whereby suitable contact may be provided with a source of electrical potential. Since the brush-holder-bracket 60 is fixedly secured to a portion of housing 10, the aforesaid terminal and bus bar 54 are considered as being supported by the housing, however, it will, of course, be understood that they are electrically insulated from said housing.

As used herein the phrase "electrolytic tool" contemplates an electrically conductive wheel such as, by way of example, is used in practicing electrolytic shaping such as, by way of example, is set forth in my aforesaid Patent No. 2,946,731.

It should be understood that various changes may be made within the scope of the appended claims without departing from the spirit of the invention.

What is claimed is:

1. An electrical device for conducting a high amperage of electricity from a source of electricity to a pair of rotating wheels comprising a housing having spaced end portions and a chamber between said end portions, journal means in each of said end portions, an elongated spindle of high strength and high electrical resistance metal rotatably mounted in said journal means, a central portion of said spindle extending through said chamber and the ends of said spindle projecting beyond said end portions, said spindle having an axial bore in the center thereof and extending completely therethrough, an elongated conductor extending through the center of said bore from one end of said spindle to the other end thereof, a short sleeve of highly conductive material surrounding each end of said elongated conductor and tightly fitting within the ends of said bore, an elongated sleeve of insulating material within said bore between said short sleeves and surrounding said elongated conductor, a diametral bore in the central portion of said spindle intersecting said axial bore, a collector ring in said chamber and surrounding the central portion of said spindle, radial conductors in said diametrical bore connecting said collector ring to said elongated conductor, means insulating said radial conductors and collector ring from said spindle, said pair of rotating wheels being electrically conductive and secured to the ends of said spindle, brush means in said chamber, insulating means movably mounting said brush means on said housing, resilient means urging said brush means into rubbing contact with said collector ring, conducitve means connecting said brush means to said source of electricity.

2. An electrical device as defined in claim 1, wherein the ends of said spindle extend through said rotating wheels, nut means threaded on the ends of said spindle so as to retain said wheels thereon.

References Cited in the file of this patent
UNITED STATES PATENTS

| | | |
|---|---|---|
| 1,794,291 | Hobart | Feb. 24, 1931 |
| 2,248,394 | Sorensen | July 8, 1941 |
| 2,274,514 | Willsey | Feb. 24, 1942 |
| 2,636,066 | Sciaky | Apr. 21, 1953 |
| 2,673,076 | Coclesser | Mar. 23, 1954 |
| 2,798,977 | Henter | July 9, 1957 |